March 13, 1951  R. BARNABY ET AL  2,544,646
ANGULAR VELOCITY MEASURING INSTRUMENT
Filed June 16, 1948  3 Sheets-Sheet 1

INVENTORS
ROLAND BARNABY
ALBRECHT E. REINHARDT
BY
Herbert P. Thompson
ATTORNEY.

March 13, 1951  R. BARNABY ET AL  2,544,646
ANGULAR VELOCITY MEASURING INSTRUMENT
Filed June 16, 1948  3 Sheets-Sheet 2

INVENTORS
ROLAND BARNABY
ALBRECHT E. REINHARDT
BY
Herbert H. Thompson
their ATTORNEY March 13, 1951 R. BARNABY ET AL 2,544,646
ANGULAR VELOCITY MEASURING INSTRUMENT
Filed June 16, 1948 3 Sheets-Sheet 3

INVENTORS
ROLAND BARNABY
ALBRECHT E. REINHARDT
BY
Herbert H. Thompson
their ATTORNEY Patented Mar. 13, 1951

2,544,646

UNITED STATES PATENT OFFICE 2,544,646

ANGULAR VELOCITY MEASURING INSTRUMENT

Roland Barnaby, Hempstead, N. Y., and Albrecht E. Reinhardt, Flourtown, Pa., assignors to The Sperry Corporation, Great Neck, N. Y., a corporation of Delaware Application June 16, 1948, Serial No. 33,344

12 Claims. (Cl. 264—1)

This invention relates to instruments for measuring rates of turning and is particularly but not exclusively concerned with the determination of slow angular rates of the order of about one or two revolutions per hour. The invention refers to a novel form of instrument which has no rotating parts but depends for its operation on the vibration of constrained masses. Heretofore it has been common to employ gyroscopic instruments for measuring rates of turn, but turn instruments embodying vibrating reeds have also been disclosed for instance by Lyman and Norden in U. S. Reissue Patent No. 22,409.

One of the principal objects of the present invention is to provide a construction in which the various constraints can be independently varied so as to obtain a comparatively large signal from very small rates of turn.

Another object of the invention is to separate the primary and secondary vibrations so that no spurious indication will be given when the rate of turn is zero.

Gyroscopic rate of turn instruments are already known in which a spinning gyro, forced to turn about an axis perpendicular to the axis of spin, exerts a couple proportional to the rate of turn.

The present invention depends on the cognate fact that if a mass is maintained in oscillation in a straight line along which it is guided by some constraint, the oscillating mass will apply no force (except its weight) transversely to the guide so long as the guide maintains a constant direction in space; but if the guide is given a forced rotation about an axis at right angles to itself, the oscillating mass will apply to the guide transverse alternating or pulsating forces whose average magnitude irrespective of sign will be proportional to the angular velocity of the forced rotation. These forces may be measured by using a piezo-electric crystal such as quartz or Rochelle salt as the guiding constraint. The force exerted on the crystal by the oscillating mass will cause electrical potentials to be developed on the faces of the crystal and these potentials, amplified if necessary, may be indicated on a voltmeter calibrated as rate of turn. The forces may also be measured by supporting the guide elastically on the frame or by making the guide itself elastic, in which case the motion of the mass will no longer be in a straight line with reference to the frame, but round an ellipse. The width of the ellipse perpendicular to the primary oscillation will be a measure of the rate of the forced rotation. This elliptical motion may be regarded as compounded of two linear oscillations at right angles of the same frequency: the original or primary oscillation which is maintained at constant amplitude and the induced or secondary oscillation with an amplitude depending on the rate of turn of the guiding constraint.

It was proposed by Lyman and Norden in Reissue Patent No. 22,409 to make the oscillating mass in the form of a vibrating reed of circular section maintained by an alternating current magnet in continuous vibration in a plane fixed with respect to the frame. If the reed is supposed to be vertical with its lower end firmly anchored to a massive stationary base or frame, we may regard the tip of the reed as the oscillating mass to be considered. For small amplitudes of oscillation the path of the tip may be considered as substantially rectilinear and horizontal so long as the base is stationary, but when the base is rotated in azimuth the tip of the reed will display the characteristics hereinbefore described and follow an elliptical path. The stiffness of the whole reed transverse to the plane of the primary vibration is the guiding constraint. When the base and the magnets which maintain the vibrations are together given a forced rotation round the normally vertical axis of the reed, and the motion of the tip of the reed becomes elliptical, the width of the ellipse corresponding to the secondary oscillation will afford a measure of the rate of forced rotation. What is true of the tip is obviously also true of each successive element lower down the reed except that the amplitudes of the motions of the elements diminish the nearer they are to the base.

The stiffness of the reed in the plane of the primary vibration cooperates with the mass of the reed to confer a natural frequency of vibration in that plane and leads to economy of driving power when the forced and natural frequencies are equal. When the reed has a uniform circular section as in the Lyman construction its stiffness is the same in all directions, but it is obvious that the transverse stiffness which provides the guiding constraint, has a different function in the apparatus from the stiffness in the plane of the primary vibration which produces resonance, and it will be apparent that it is desirable to be able to vary either of these stiffnesses independently according to its function without affecting the other stiffness.

It is a feature of the present invention that these two elastic constraints, namely the guiding constraint and the tuning constraint are provided by independent members each capable of separate adjustment to produce the maximum sensitivity.

The invention also relates to the novel features or principles of the instrumentalities described herein, whether or not such are used for the stated objects, or in the stated fields or combinations.

Further features, objects and advantages of the invention will be understood from the accompanying specification and the annexed drawing in which.

Figure 1:
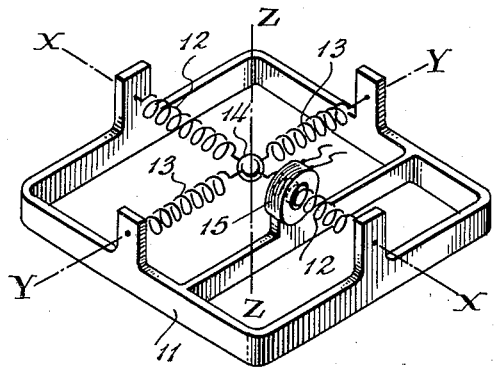
Fig. 1 is a diagrammatic representation of an elementary and incomplete form of the invention.

Referring now to Fig. 1 a massive frame 11 forms the base of the instrument and carries, by two pairs of helical springs 12, 12 and 13, 13, a heavy mass 14. The arrangement gives mass 14 two degrees of linear freedom in a horizontal plane and also allows a third freedom along the Z axis but this last-named freedom is ignored in the present analysis in which also it is assumed that the mass has no weight to displace it out of the horizontal plane of the X and Y axes. The pair of springs 12, 12 enable the mass to oscillate along the axis of these springs and this is the X or primary axis along which the oscillation is maintained, so long as the instrument is in use, by an electro-magnetic driving coil diagrammatically shown at 15 which is energized by alternating current at some definite frequency. The second pair of springs 13, 13 have their axis lying along the Y axis of the instrument and normally constrain the mass 14 to remain on the X axis. The axial stiffness of the springs 12 is so proportioned to the mass 14 that the natural period of oscillation along axis X resonates with the alternating driving force of coil 15. So long as frame 11 is stationary the Y axis springs 13 do nothing except to add slightly to the effect of the stiffness of the X axis springs and this may be allowed for by a slight reduction in the stiffness of the springs 12.

If now the frame 11 be given a slow rotation around the vertical axis Z, the mass 14 will no longer continue to execute a rectilinear oscillation along the X axis but will have a component of motion parallel to the Y axis and of the same frequency as the X axis oscillation. The path of mass 14 will therefore become an ellipse and the width of the ellipse measured parallel to the Y axis will be an indication of the rate of turning of the frame 11 about the Z axis. It will be observed that the stiffness of the springs 12, 12 forms the tuning constraint which in conjunction with mass 14 decides the natural frequency of the primary oscillation. The springs 13 form the guiding constraint. Our invention thus includes two separate constraints derived from two distinct physical organs of the apparatus.

We have found by calculation, and proved by experiment, that for a given rate of turn of the base of the instrument round the vertical axis, the maximum response or amplitude of the mass 14 parallel to the Y axis is given when the natural frequency of oscillation along the Y axis resonates with the frequency of the primary vibration along the X axis. We have also found that the amplitude of the movement along the Y axis is directly proportional to the rate of turn of the instrument round the Z or vertical axis.

Our invention, however, is not limited to the case where the natural frequency of oscillation is the same along both the X and Y axes. We may for example arrange the Y axis mode to have a natural frequency equal to a harmonic of the X axis frequency. Alternatively, we may make the two frequencies incommensurate so that stray vibrations transmitted from the X axis through the frame to the Y axis will not initiate unwanted parasitic oscillations along the Y axis at the frequency of the X axis oscillation.

On close analysis it will be found that the amplitude of the oscillation along the Y axis, that is to say the width of the ellipse, for a given rate of turn about axis Z depends, among other things, upon the damping of the oscillation mode in the direction Y. Energy is fed into the vibrating system by the rotation around Z and in the absence of all damping would eventually cause a large amplitude of the Y mode of oscillation. Actually, of course, the amplitude has a finite limit when the rate of dissipation of energy due to damping is equal to the rate of energy supply. It is therefore important that the damping of the Y mode of oscillation should be as light as possible so that the instrument shall be very sensitive to slow rates of turn and also as constant as possible for a given amplitude, so that the instrument shall be capable of permanent calibration to afford a true measure of the rate of turn. On the other hand the damping of the springs 12, 12 is of less importance because the losses occurring in the X axis mode of oscillation can be made good by increasing the power of the driving coil as much as required. The oscillation of either mode represents a certain amount of stored energy and it is desirable that this stored energy in the case of the Y axis oscillation should be as small as possible so that there may be a quick response of amplitude when any change occurs in the angular velocity round axis Z. On the other hand the energy of oscillation along the X axis should be considerable to assist in stabilizing the amplitude of this mode.

It is also very important to isolate the Y oscillation from any interference due to the X oscillation. Otherwise the Y oscillation will not be zero, as it should be, when the frame 11 is stationary and not turning round the vertical axis Z. For this reason care must be generally taken that the common axis of the driving coil 15 and of the two springs 12 is virtually at right angles to the axis of the springs 13. The frame 11 must also be very rigid so as not to communicate vibration from the X axis to the axis Y.

Since in Fig. 1 the one mass 14 is common to both modes of oscillation, and both modes should preferably have the same natural frequency, it follows that the elastic constant of the pair of springs 12, 12 should be equal to the elastic constant of the pair of springs 13, 13 and this elementary model (shown in Fig. 1) therefore allows little scope for variation in the conditions affecting the two modes of oscillation and does not completely attain many of the objects of our invention.

Figure 2:
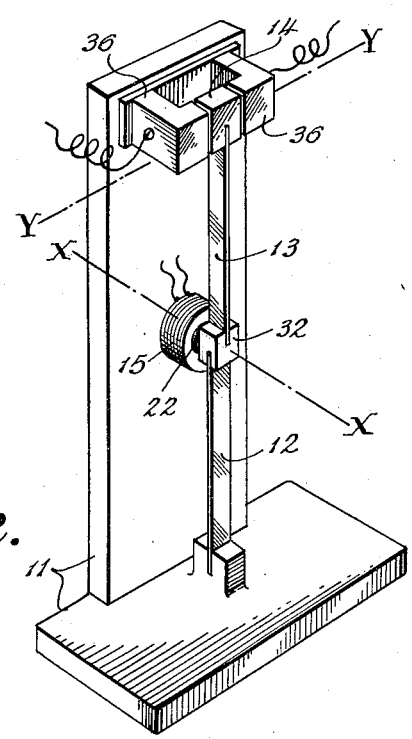
Fig. 2 shows one form of the invention using laminar springs as the constraints and a capacity pick-off system for measuring the secondary vibration.

Having described the fundamental principles of our invention with reference to Fig. 1, we now turn to Fig. 2 in which a practical form of rate of turn instrument embodying our invention is shown.

In this construction the base plate 11, whose rotation round a vertical axis is to be measured, carries a block 32 by means of a vertical laminar spring 12. The width of the spring is parallel to the Y axis, and the block 32 thereby has a restrained freedom of motion substantially along the XX axis but no other freedom. The block 32 which is made of magnetic material or carries a magnetic armature is maintained in constant vibration along the axis by a driving coil 15 and pole piece 22, energised from a source of alternating current not shown in the diagram.

Block 32 carries by a second spring 13 a mass 14. The plane of spring 13 is perpendicular to the plane of spring 12 and this confers on mass 14 a constrained freedom to oscillate substantially along the straight line YY and in addition it has a freedom to oscillate parallel to the XX axis due to the flexibility of spring 12. Hence spring 12 provides the tuning constraint and spring 13 the guiding constraint. This arrangement gives the power to dispose of the X and Y constraints separately and independently. Hence, by varying the masses of the parts 14 and 32 it is possible to give large differences of elastic constant to the springs 12 and 13 and at the same time to make the natural period of mass 14 the same in both the XX and YY directions so as to resonate with the alternations of the driving coil 15. The mass 14 will only have an amplitude in the YY direction when the base 11 is being turned round the vertical axis Z and the amplitude of this vibration will be a measure of the rate of rotation. In Fig. 2 an electrostatic capacity pick-off is shown for measuring the YY amplitude. Two capacity plates 36 supported on a bracket carried by the main frame 11 are disposed one on either side of the mass 14 with their planes parallel to the X axis. Oscillation of mass 14 along YY varies the electrostatic capacity between itself and the individual plates. The capacity plates 36 and the base 11 (which is in electrical contact through the springs with the block 14) are connected to a capacity bridge circuit and the signals derived therefrom, which are proportional to the amplitude of vibration of mass 14 in the direction YY, are amplified in any well-known manner and applied to a voltmeter which may be calibrated in rate of turn.

Since the amplitude of oscillation of the block 14 is proportional to the reaction of spring 13 which forms the guiding constraint, the voltmeter reading will also be proportional to the spring reaction. Since the path of the mass 14 is slightly curved out of the horizontal plane through YY, an unwanted vibration may be communicated vertically through the springs 13 and 12 to the base 11 at a frequency double that of the driving coil 15. In some cases it may therefore be advantageous to duplicate the mechanism shown in Fig. 2 by putting a second set of springs and masses identical with parts 12, 13, 14 and 32 in an inverted position on the under side of the plate 11. A duplicate driving coil will be necessary but a second capacity pick-off may be dispensed with.

Figure 3:
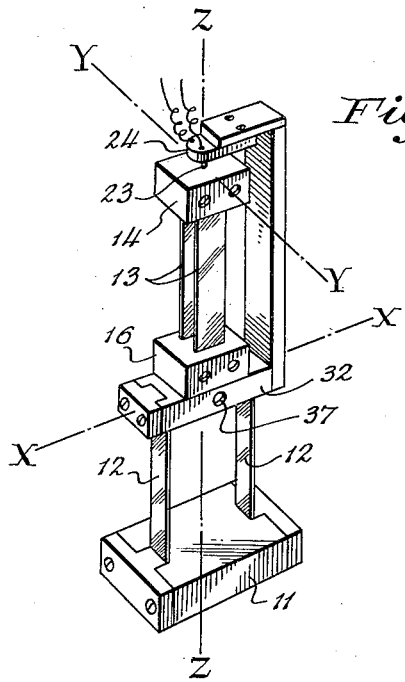
Fig. 3 is similar to Fig. 2 with the constraining springs duplicated, and a piezo-electric pick-off.

A development of the vibrating system of Fig. 2 is shown in Fig. 3 where a base 11 supports a block 32 by two parallel leaf springs 12, 12 and block 32 carries mass 14 by two similar parallel leaf springs 13, 13 having their planes at right angles to those of 12, 12. By this means the path of the center of gravity of block 32 is curved as before but the motion of the block itself is translational without rotation. The block 32 is caused to oscillate in the direction XX by a driver coil and magnet similar to 15 and 22 in Fig. 2 but not shown in this drawing. In the arrangements shown in Figs. 2 and 3 it is desirable that the axis of the driver magnet and the motion given to block 32 by the springs 12, 12 should be exactly in the plane containing the XX axis at right angles to the plane of motion of mass 14 on springs 13. If this condition is not satisfied, the primary vibration will have a component along the Y axis and the instrument will not give a zero signal when the base is stationary. For this reason the lower ends of springs 13 are shown in Fig. 3 as being held in a separate clamping plate 16 rotatably mounted on the block 32. An adjusting screw 37 is provided for fine adjustment of this rotation round the vertical axis, by means of which, when the base 11 is stationary, any component of motion of the mass 14 along the YY axis can be eliminated.

In order to measure the linear amplitude of the oscillation of mass 14, parallel to the Y axis, a piezoelectric crystal pick-off is shown in this example. We have found that a commercial type of crystal and crystal holder as commonly used for the pickup in phonographs and similar sound reproducing devices is very satisfactory for this purpose and such a crystal holder is shown at 24. A needle 23, attached to the crystal (not shown) inside the crystal holder, rests in a conical depression in the top of mass 14 and the voltages developed on the crystal as a result of the stresses produced through needle 23 by the motion of mass 14 are conveyed by electrical leads to an amplifier. The amplified A. C. voltages may be read on a voltmeter calibrated in rates of revolution of the apparatus round the vertical axis Z. The crystal holder 24 is mounted preferably on a rigid bracket attached to block 32 so that there will be no relative motion between mass 14 and needle 23 when the rate of rotation round Z is zero and the mass 14 is vibrating only in a plane through the X axis.

Alternatively a capacity pick-off may be used as shown in Fig. 2.

It will be seen that the type of translatory spring-mass system illustrated in Fig. 3 has the advantage of being extremely rigid with respect to forces applied in the plane containing the width of the spring; while at the same time such a spring system can be given any desired flexibility with respect to forces applied at right angle to that plane.

Figure 4:
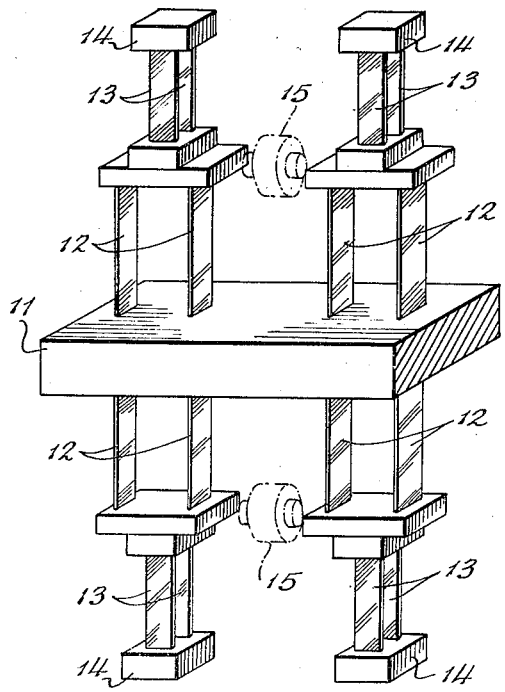
Fig. 4 shows an aggregation of several oscillating units.

A well-known theorem states that in the case of the vibration of any material body the center of gravity of the body and of its support taken together, is stationary in space. Thus in the case of Fig. 2 although the center of gravity of the reed system consisting of the springs 12 and 13 and the blocks 14 and 32 will be in motion, the center of gravity of the whole apparatus including the base 11 will be stationary. This can only be the case if the base executes a complementary motion in the opposite direction to that of the reed so that the amplitude of the center of gravity of the base is to the amplitude of the center of gravity of the reed system as the mass of the latter is to the mass of the former. This motion of the base may be kept small by making the base very massive. It has been found in practice that if the vibrating system consists of a single unit, it must be supported on a massive structure with a high damping capacity, made for example of lead, to prevent the primary vibration of the reed along the X axis from being reflected back from the base and giving a spurious signal along the Y axis. The use of a heavy structure may be avoided however by using two counter-vibrating systems arranged so that all self-generated vibration is eliminated within the structure. In the case of a device such as that shown in Fig. 3 for example four similar units may be assembled as shown diagrammatically in Fig. 4, where two units side by side compensate one another's vibrations in the horizontal plane; and two more units fixed in inverted positions below the base compensate for vertical components. The base may then consist of a light structure provided of course that the right-hand and left-hand units vibrate with a phase difference of 180°. It should be understood that this multiple-unit construction is not confined to the type of unit shown in Figure 3. For the purpose described similar aggregations may be made of units of any form according to our invention.

Figure 5:
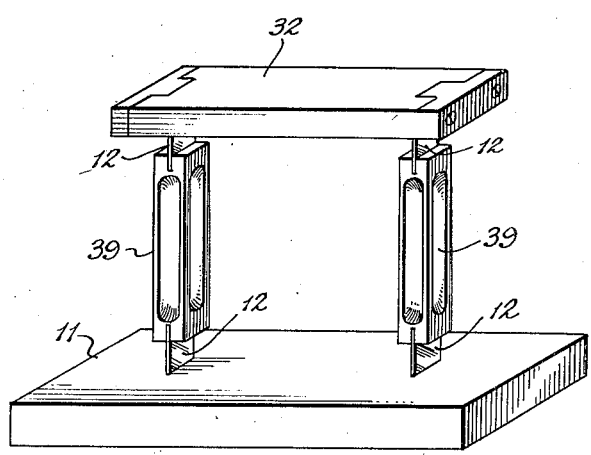
Fig. 5 shows a form of stiffened constraining spring.

Reverting to the forms of vibrating system shown in Figs. 2 and 3, it will be observed that in order to secure a close approximation to rectilinear movement of the masses the springs 12 and 13 must be of substantial length. This is disadvantageous because these springs also have to act as struts and carry the vertical load due to the weight of the masses. For this reason we prefer to divide each spring and insert a light yet rigid intermediate structural member between the parts as shown in Fig. 5. In this figure the block 32 is supported on the base 11 by the springs 12 stiffened by the light rigid structures 39. The structure 39 may be made of light material such as aluminum or magnesium and channeled out as shown to have a section of the maximum moment of inertia for a given weight of material.

For convenience of explanation it has been assumed in the specification that the X and Y axes are in a horizontal plane perpendicular to one another, but it will be understood that, without departing from the spirit of our invention, these two axes may be in any plane whatsoever, and the rotation then measured will be about an axis perpendicular to that plane. The rotation so measured will not necessarily be the total rotation given to the instrument but will be the vector of the total rotation resolved about the axis in question namely the Z axis in the figures.

Although the simplest case to consider is that in which the X and Y constraints act at right angles and the driving force which maintains the primary oscillation acts along the line coinciding with one of them, we may modify the construction so that the X and Y axes are not at right angles and the driving force acts along the line of one or neither of them. In cases where there is a false indication along the Y axis when the angular rotation of the Z axis is zero, such false indication may be eliminated by skewing the axes. We may also deliberately arrange the X and Y axes to intersect at some angle not 90° so as to have a definite amplitude along the Y axis when the angular rate of turn of the base is zero, this indication being regarded as an index error to be subtracted algebraically from the reading along the Y axis so as to obtain a measure of the true angular velocity.

Figure 6:
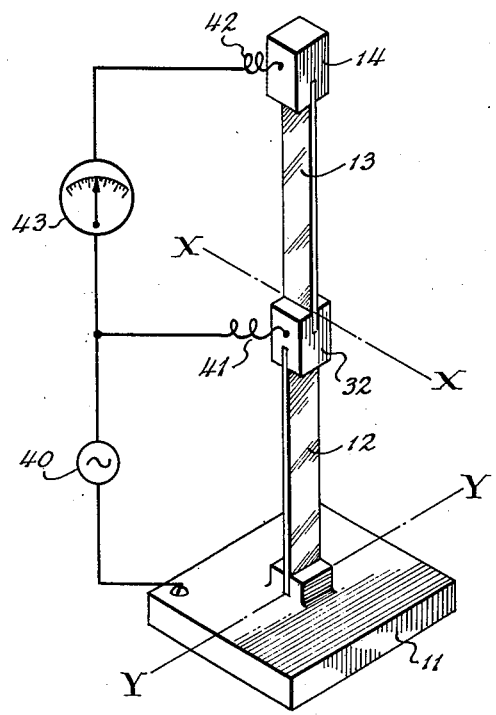
Fig. 6 shows a form of Fig. 2 in which the springs consist of piezo-electric crystals.

Fig. 6 shows an alternative embodiment of our invention which is similar in principle to that of Fig. 2 but in which piezo-electric crystals are employed for the quadruple purpose of supporting the weight of the oscillating masses, of providing both tuning and guiding constraints, of developing electrical signals proportional to the amplitude of the secondary vibration and of providing the driving force for maintaining the primary oscillation. In Fig. 6, 11 is the base whose rate of rotation round the vertical is to be measured. The base, which is electrically conducting, carries a strip or lamina 12 of Rochelle salt, quartz crystal, or other piezoelectric substance which supports the block 32 also made of electrically conducting material. The lamina 12 is so cut from the mother crystal with reference to the natural crystal axis that when a difference of electrical potential is impressed at its two ends clamped in the blocks 11 and 32 respectively, the lamina will be deformed and become slightly bent round an axis parallel to YY. The lamina thus performs the double function of (1) providing an elastic support for the block 32 as was done by the spring 12 of Fig. 2 and (2) of providing the driving force to cause oscillation of the block 32 along the line XX for which purpose it takes the place of the electromagnet and coil 15 of Fig. 2. To this end a source 40 of alternating current (Fig. 6) has one terminal connected to the base 11, and the other terminal connected by a light flexible lead 41 to the block 32. By this means the lamina 12 and block 32 are thrown into vibration at the frequency of the alternating current, and, by proper choice of the cross-section of the lamina with relation to the mass of block 32 and parts carried thereby, the natural mechanical frequency of the vibration may be made to resonate with the A. C. frequency.

The block 32 clamps the lower end of a second piezo-electric lamina 13 similar to lamina 12, so that the planes of the two laminae are at right angles. A block 14 of electrically conducting material is clamped at the top of lamina 13 which is relatively stiff to bending round an axis parallel to YY. Consequently, when the generator 40 is in operation and the base 11 stationary, block 14 will be in constant vibration along a line which, for small amplitudes, will be substantially straight and parallel to XX.

However, if the base 11 is given a rotation round the vertical axis, the block 14, for reasons already set forth, will execute an ellipse, and in addition to its motion parallel to XX will have a component of motion parallel to YY by bending the elastic lamina 13 from side to side. This bending will cause alternating electrical potentials to be developed at the ends of lamina 13. The amplitude of these potentials will be proportional to the amplitude of the vibration of block 14 parallel to YY and therefore proportional to the rate of turning of the base 11. On connecting a sensitive A. C. voltmeter 43 to blocks 32 and 14 by the flexible wires 41 and 42 this rate of turning may be accurately measured. It may be remarked that since the crystal lamina 13 is not electrically conducting, one pole of the voltmeter is insulated from the alternator 40 and the voltmeter cannot be supplied with current from the alternator.

The lamina 13 thus takes the place of the leaf spring or guiding constraint 13 of Fig. 2 and at the same time replaces the capacity pick-off and plates 36 of that figure.

If the A. C. potentials developed by the lamina 13 are too small to be read directly by a voltmeter, an electronic linear amplifier may be interposed between electrodes 32 and 14, and the voltmeter. The application of such amplifiers is well known to those skilled in the art, and, since it forms no part of the present invention, further description thereof is deemed unnecessary.

In the embodiment of our invention shown in Fig. 6, the block 14 is maintained in oscillation along a substantially straight path parallel to the line XX by the action of the alternating potentials from generator 40 on the bender crystal 12, the crystal 13 being substantially rigid in the vertical plane through XX. Crystal 13 also acts as a yielding guiding constraint which constrains the block 14 to move in the vertical plane through XX so long as there is no rotation of the instrument round the vertical. Crystal 13 further provides the means of measuring its own reactions when the block 14 has a component of motion parallel to YY caused by and proportional to any rate of turn of the instrument about the vertical.

Figure 7:
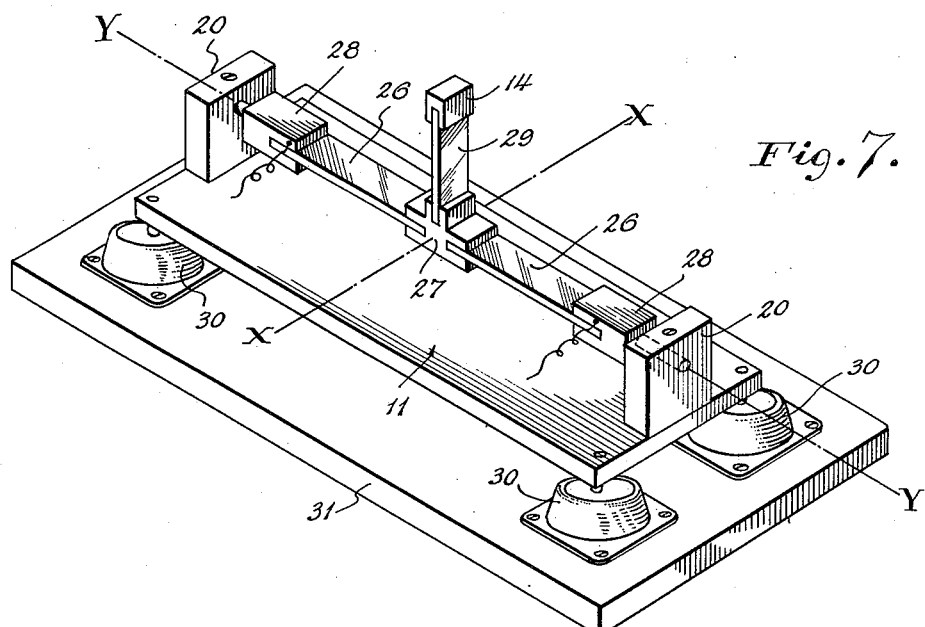
Fig. 7 shows another form of the invention in which piezo-electric elements are employed.

Another form of our invention similar in principle to Fig. 6 is shown in Fig. 7. In this embodiment a base 11 carries on brackets 20, 20 two crystals 26, 26 of Rochelle salt or other piezoelectric substance held in clamps 28, 28 and supporting between them a block 27 in which the inner ends of the crystals are clamped. The plates 26 are cut with such reference to the natural crystal axis that they twist round the axis Y when electrical potentials are impressed upon them through the clamps 27 and 28 by leads not shown in the illustration. Consequently, if the clamp 27 is electrically connected to one pole of a source of alternating current, and the two clamps 28 to the other pole, clamp 27 will be thrown into oscillation round the axis Y. Clamp 27 also carries another crystal plate 29 which supports the vibrating mass 14. The wide crystal plate 29 is in the form of a thin sheet with its plane passing through the X axis so that it is very stiff to bending in this plane, and is so cut from the mother crystal that when bent round the X axis voltages will be developed at the ends of the crystal proportional to the bending force. The mass 14, which incidentally forms one of the electrodes for picking off the voltages from the crystal (the other electrode being the clamp 27), is preferably made of such a mass in relation to the stiffness of the plate 29 that its natural period of oscillation round the X axis resonates with the alternating voltage applied to the twister crystals 26. The torsional stiffness of the two crystal plates 26 is preferably so related to the moment of inertia of the combined mass made up of the clamp 27, the bender crystal 29 and the load 14, that oscillation round the Y axis has a natural frequency which also resonates with the frequency of the supplied current which maintains the oscillations.

As in the case of Fig. 2 the motion of the mass 14 is restricted to the vertical plane through the X axis so long as the instrument has no rotation round the Z axis; but when such rotation occurs the center of gravity of mass 14 executes an elliptical orbit which involves bending to and fro of the crystal plate 29 and produces a voltage proportional to the rate of turning which may be read on a voltmeter as described with reference to Fig. 6 herein.

In order to prevent disturbances due to extraneous vibrations from affecting the apparatus and causing spurious readings when there is no rotation round the vertical, the base plate 27 is shown as mounted on shock absorbers 30 of any known type on sub-base 31.

Also, with the object of eliminating vertical oscillations at the octave of the fundamental vibration due to the curved path of motion of mass 14 and crystal 29, these parts may be balanced by a second mass and crystal projecting downward from the common clamp 27.

For the sake of illustration some of the embodiments herein described are shown with piezoelectric pick-offs as in Fig. 3 for measuring rate of turn and others with capacity types of pick-off as in Fig. 2 but it will be understood that any type of pick-off may be used with any type of vibratory system. The embodiment of Fig. 7 is shown as mounted on a shock-absorbing base to shield it from extraneous shocks, but it is to be understood that the use of such shock-absorbing devices may be advantageous for any form of our invention and is not limited to the particular form shown in Fig. 7.

Figure 8:
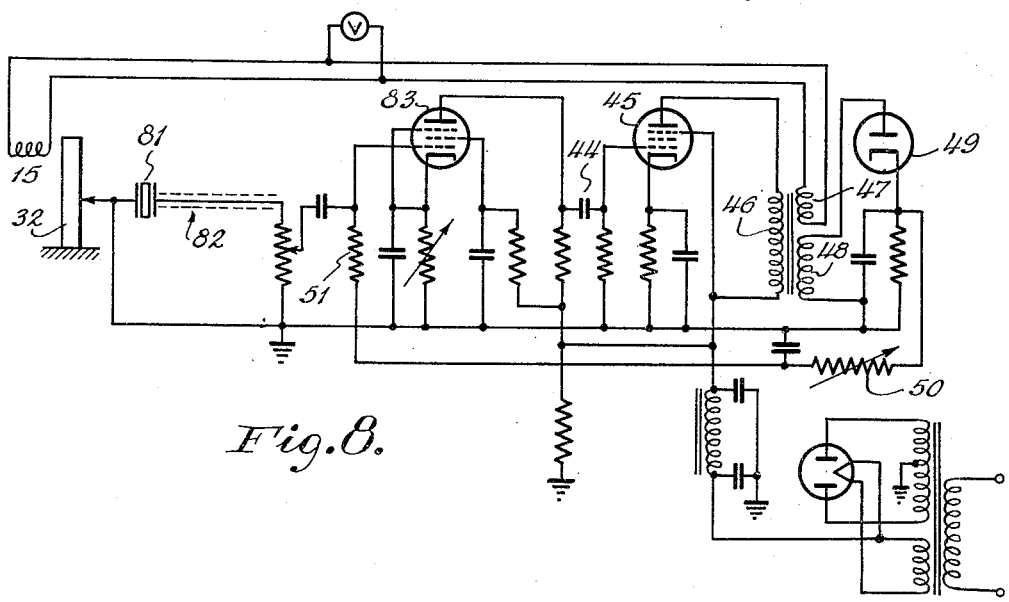
Fig. 8 is a diagram of an automatic maintaining and amplitude regulating circuit.

It has hereinbefore been assumed that the drive for the primary vibration would be obtained by magnets or crystals fed from an external source of alternating current at a fixed frequency. We may, however, arrange for the drive to be self-exciting at the natural frequency of the primary vibration and independent of the frequency of the electrical supply. For this purpose we may in the case of Fig. 2 for example mount on the base 11 a piezo-electric crystal in contact with the block 32 so as to be excited by the movements of the block along the X axis. The voltage developed on the crystal, after amplification, may be applied to the driving coil 15. It is desirable to use an amplifier embodying an automatic amplitude control feature so as to maintain the primary oscillation at a substantially constant amplitude. The diagram of Fig. 8 shows one form of amplifier suitable for this purpose. The crystal is shown at 81 mechanically connected to the block 32. One face of the crystal is grounded to the base 11 and the other face is connected by shielded lead 82 through an adjusting resistance and a capacitor to the grid of the tube 83. The output of tube 83 is coupled by capacitor 44 to the grid of tube 45, the anode current of which tube passes through the primary of transformer 46. This transformer has two secondaries one of which, 47, is used to feed directly the driving coil 15. The other secondary 48 is provided for supplying an automatic amplitude control voltage similar to the automatic volume control used in radio receivers, the output from this secondary after rectification at diode 49 passes through the adjustable resistance 50 and fixed resistance 51 to increase the positive bias of the grid of tube 83. It follows that any increase of the A. C. voltage applied from secondary 47 to the driving coil 15 will be largely suppressed because the D. C. controlling voltage from the diode 49 will increase the positive bias of the grid of tube 83 and reduce the gain of that tube. A conventional power supply with rectifier tube and smoothing and decoupling networks, but as these are very familiar to those skilled in the art no verbal description is necessary.

In cases where the drive of the primary oscillation is produced by piezo-electric crystal such as lamina 12 in Fig. 6, the electric supply may be derived through a thermionic tube, the grid of which is controlled by a feed-back from the crystal itself so as to be self-maintaining at a fixed frequency after the well-known manner of a crystal oscillator.

In accordance with the patent statutes we have now disclosed several examples illustrative of the scope of our invention but it will be understood that other and different embodiments of the same basic principles may be constructed without departure from the spirit of our invention.

Since many changes could be made in the above construction and many apparently widely different embodiments of this invention could be made without departure from the scope thereof, it is intended that all matter contained in the above description or shown in the accompanying drawings shall be interpreted as illustrative and not in a limiting sense.

What is claimed is:

1. An instrument for measuring angular velocity about an axis consisting of a body maintained in oscillation in a plane containing said axis, a first elastic guiding constraint acting on said body in its plane of oscillation, a second elastic guiding constraint acting on said body in a direction substantially perpendicular to said plane, and means for measuring the reaction of said second guiding constraint on the body with movement about said axis.

2. An instrument for measuring angular velocity about an axis consisting of a body mounted to oscillate in a plane containing said axis, individual elastic constraints acting on the body at an angle to each other, one of which is substantially in said plane and the other of which is substantially perpendicular to said plane, power operated means to maintain the body in oscillation substantially along the line of action of one constraint, and means for measuring the reaction of the other constraint on the body with movement about said axis.

3. An instrument for measuring angular velocity about an axis consisting of a base, a body moving substantially in a plane with respect to said base containing the axis, a pair of elastic members, arranged in substantially mutually perpendicular relation connecting said body and said base and constraining said body to a central position of equilibrium, means carried on said base to apply discontinuous forces to said body so as to maintain it in oscillation in a substantially straight line in the line of constraint of one of the elastic members and means for measuring the forces applied by said body to the other of said elastic members with movement about the axis.

4. An instrument for measuring angular velocities comprising in combination a base, a first elastic member flexible for bending in a first plane but relatively rigid in a second plane at right angles, said first elastic member being rigidly supported at one end on the base, an element attached to the other end of said first elastic member so as to have freedom of movement relatively to the base in said first plane against the constraint of said member, a second elastic member flexible for bending in said second plane but relatively rigid in said first plane, said second member being supported at one end on said element, a mass attached to the other end of the second elastic member so as to have freedom of movement relative to said element in said second plane against the constraint of said second elastic member, driving means consisting of an electromagnet carried by said base and acting on said element so as to maintain said element and said mass in oscillation substantially in said first plane, and a pick-off carried on said base providing a measure of the amplitude of oscillation induced in said second plane caused by movement of the base about an axis at the intersection of said two planes.

5. An instrument for measuring angular velocities about an axis consisting of a body mounted to oscillate in a plane containing the axis, a plurality of piezo-electric crystals providing first and second elastic constraints, the first of which acts on the body in the plane and the second of which acts on the body normal to the plane, means for applying alternating current to the crystals forming said first constraint whereby the body is maintained in oscillation substantially along the line of action of said first constraint, and means for measuring the piezo-electric voltages generated at the faces of the crystal forming the second constraint with movement about said axis.

6. In an instrument for measuring angular velocities, a base, a first piezo-electric crystal lamina flexible for bending in a first plane but relatively rigid in a second plane at right angles, said first lamina being rigidly supported at one end on the base, an element attached to the other end of said first elastic lamina so as to have freedom of movement relatively to the base in said first plane against the constraint of said lamina, a second piezo-electric crystal lamina flexible for bending in said second plane but relatively rigid in said first plane, said second lamina being rigidly supported at one end on said element, and a mass attached to the other end of the second lamina so as to have freedom of movement relative to said element in said second plane against the constraint of said second elastic lamina.

7. An instrument for measuring angular velocities comprising in combination a base, a first elastic member flexible for bending in a first plane but relatively rigid in a second plane at right angles; said first elastic member being rigidly supported at one end on the base, an element attached to the other end of said first elastic member so as to have freedom of movement relatively to the base in said first plane against the constraint of said member, a second elastic member flexible for bending in said second plane but relatively rigid in said first plane, said second member being supported at one end on said element, a mass attached to the other end of the second elastic member so as to have freedom of movement relative to said element in said second plane against the constraint of said second elastic member, driving means consisting of an electromagnet carried by said base and acting on said element so as to maintain said element and said mass in oscillation substantially in said first plane, and a pick-off carried by said element providing a measure of the amplitude of oscillation induced in said second plane caused by movement of the base about an axis at the intersection of said two planes.

8. An instrument as claimed in claim 7, in which the first and second elastic members consist respectively of spaced pairs of laminar springs mounted side by side with their planes parallel.

9. An instrument as claimed in claim 7, including settable means on said element for adjusting the angular relation between said first and second elastic members.

10. In an instrument for measuring angular velocities, a base, first spring means flexible in a first plane but relatively rigid in a second plane at right angles; said spring means being connected at one end to the base, an element attached to the other end of said first spring means so as to have freedom of movement relatively to the base in said first plane against the constraint of said spring means, a second spring means flexible in said second plane but relatively rigid in said first plane, said second spring means being supported at one end on said element, and a mass attached to the other end of the second spring means so as to have freedom of movement relative to said element in said second plane against the constraint of said second spring means.

11. An instrument as claimed in claim 10, in which said first and second spring means consist respectively of spaced pairs of laminar springs mounted side by side with their planes parallel.

12. An instrument as claimed in claim 11, including settable means on said element for adjusting the angular relation between said first and second spring means.

ROLAND BARNABY.
ALBRECHT E. REINHARDT.

REFERENCES CITED

The following references are of record in the file of this patent:

UNITED STATES PATENTS

| Number | Name | Date |
| --- | --- | --- |
| 2,309,853 | Lyman | Feb. 2, 1943 |